US007570769B2

(12) United States Patent
Garcia et al.

(10) Patent No.: US 7,570,769 B2
(45) Date of Patent: Aug. 4, 2009

(54) AIR LEAK SELF-DIAGNOSIS FOR A COMMUNICATION DEVICE

(75) Inventors: Jorge L. Garcia, Plantation, FL (US); Peter M. Pavlov, Plantation, FL (US); Jianfeng Shi, Sunrise, FL (US); David M. Yeager, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 907 days.

(21) Appl. No.: 10/830,669

(22) Filed: Apr. 23, 2004

(65) Prior Publication Data

US 2005/0238178 A1 Oct. 27, 2005

(51) Int. Cl.
*H04R 29/00* (2006.01)
*G01M 3/34* (2006.01)

(52) U.S. Cl. .......................................... 381/58; 73/49.3

(58) Field of Classification Search ................. 381/373, 381/58, 59, 96; 455/575.1, 550.1; 340/540, 340/605; 379/433.02, 433.03, 440; 702/47, 702/48, 63, 117, 182, 183, 185; 73/40, 49.2, 73/49.3

See application file for complete search history.

(56) References Cited

U.S. PATENT DOCUMENTS

| | | | | | |
|---|---|---|---|---|---|
| 3,028,450 | A | * | 4/1962 | Manning | 73/592 |
| 3,802,252 | A | * | 4/1974 | Hayward et al. | 73/52 |
| 4,046,220 | A | * | 9/1977 | Glenn, Jr. | 181/105 |
| 4,419,883 | A | * | 12/1983 | Gelston, II | 73/49.3 |
| 4,785,659 | A | * | 11/1988 | Rose et al. | 73/40.5 A |
| 5,114,664 | A | * | 5/1992 | Terhune | 376/245 |
| RE33,977 | E | * | 6/1992 | Goodman et al. | 73/40.5 A |
| 5,130,708 | A | * | 7/1992 | Boyden | 340/984 |
| 5,351,527 | A | * | 10/1994 | Blackburn et al. | 73/52 |
| 2004/0017921 | A1 | * | 1/2004 | Mantovani | 381/94.9 |
| 2004/0184623 | A1 | * | 9/2004 | Johannsen et al. | 381/117 |

FOREIGN PATENT DOCUMENTS

JP 05172689 A * 7/1993

* cited by examiner

*Primary Examiner*—Vivian Chin
*Assistant Examiner*—Kile Blair
(74) *Attorney, Agent, or Firm*—Barbara R. Doutre

(57) ABSTRACT

A communication device (100) is provided with a technique (400) for self-diagnosing an air leak. The leak is determined without having to open the communication device by applying a temporary excitation signal to the speaker terminals (402) to produce a damped response (404) and then monitoring the damped response (406) of the speaker.

8 Claims, 4 Drawing Sheets

AIR LEAK SELF-DIAGNOSIS FOR A COMMUNICATION DEVICE

TECHNICAL FIELD

This invention relates in general to hermetically sealed communication devices and more particularly to methods for detecting air leakage in such devices.

BACKGROUND

Portable communication products, such as two-way radios, often need to operate in adverse environments and thus require a hermetic seal for submersability. If the seal has an air leak, the integrity of the product will be compromised and water intrusion may occur. Even products that are not expected to be submersible are often expected to operate in blowing rain conditions and as such a reliable seal is needed. Traditional air leakage testing techniques utilize a vacuum to create a pull on the outside of the product and measure the pressure change over time. However, the vacuum test is time consuming and laborious thereby causing delays in the manufacturing process.

Air leaks may also occur once a product has been in use out in the market. It is unlikely that a customer would be aware of the leak until a product failure, such as water intrusion, occurs. It would be beneficial if an air leak could be detected prior to any product failure.

Accordingly, there is a need for an improved technique for detecting air leakage in a communication device.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
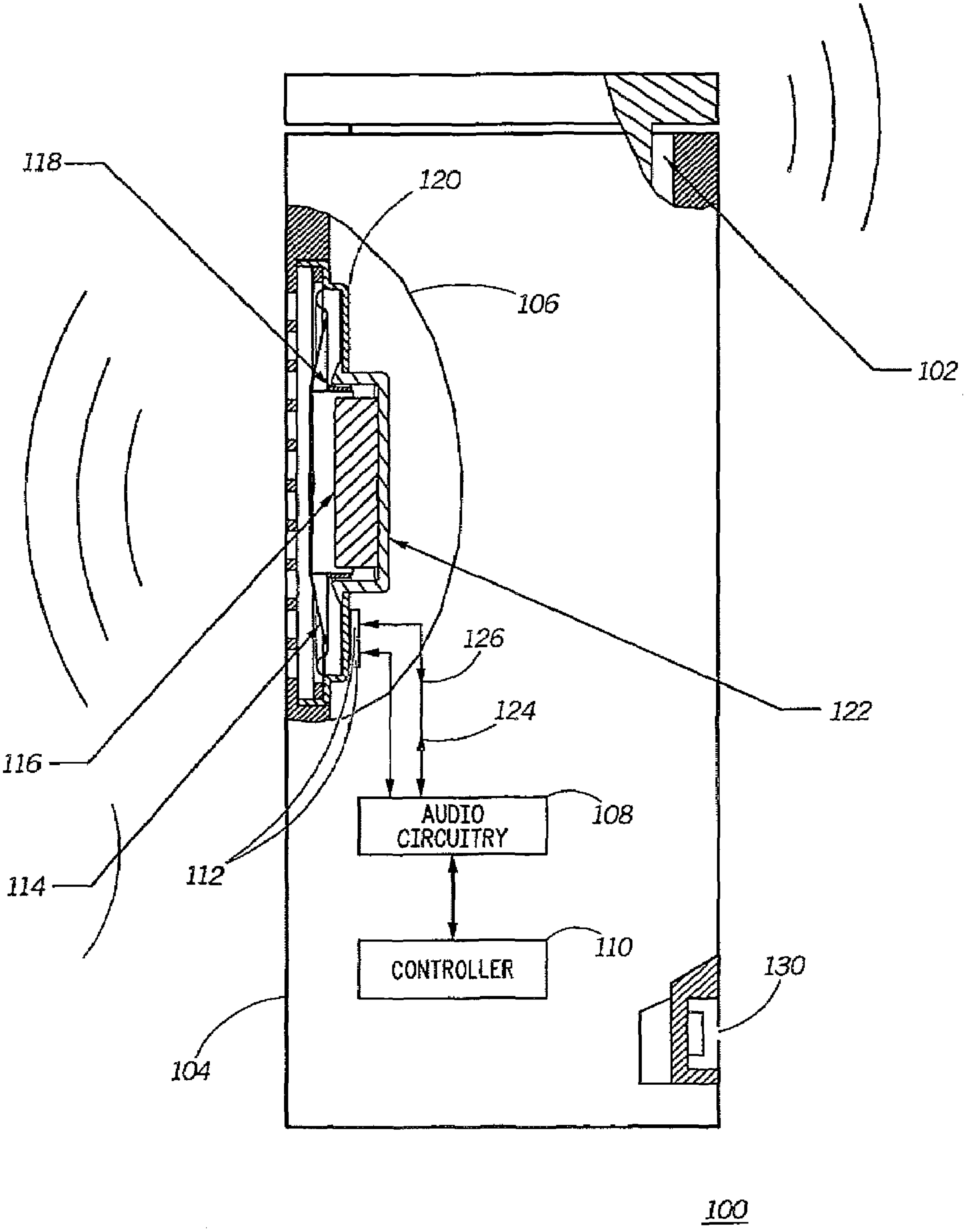
FIG. 1 is a block diagram of a communication device being tested for an air leak in accordance with the present invention.

While the specification concludes with claims defining the features of the invention that are regarded as novel, it is believed that the invention will be better understood from a consideration of the following description in conjunction with the drawing figures, in which like reference numerals are carried forward.

FIG. 1 shows a cross section of a communication device 100, such as a two-way radio or phone, being tested for a gross air leak 102 in accordance with the present invention. The communication device 100 includes a housing 104 and a speaker 106 coupled to the housing. Speaker 106 consists of a typical speaker assembly comprising a diaphragm 114, voice coils 116, magnet structure 118, basket 120 and back plate 122. The speaker 106 is connected to audio circuitry 108 and controller circuitry 110 via speaker terminals 112. A pressure equalization path 130 that passes air but not water is also present. The equalization path 130 equalizes the pressure inside the communication device 100 with the outside environment.

In accordance with the present invention, the communication device 100 provides air leak self-diagnosis by monitoring signal characteristics of the speaker 106. By applying an excitation signal 124 to the speaker terminals 112 via the controller 110 and monitoring a back electro-motive force (EMF) response 126 at the speaker terminals, the presence of a gross leak can be determined. The air leak is determined based on one or a combination of zero crossings, time decay, and amplitude of the EMF response from the speaker.

Figure 2:
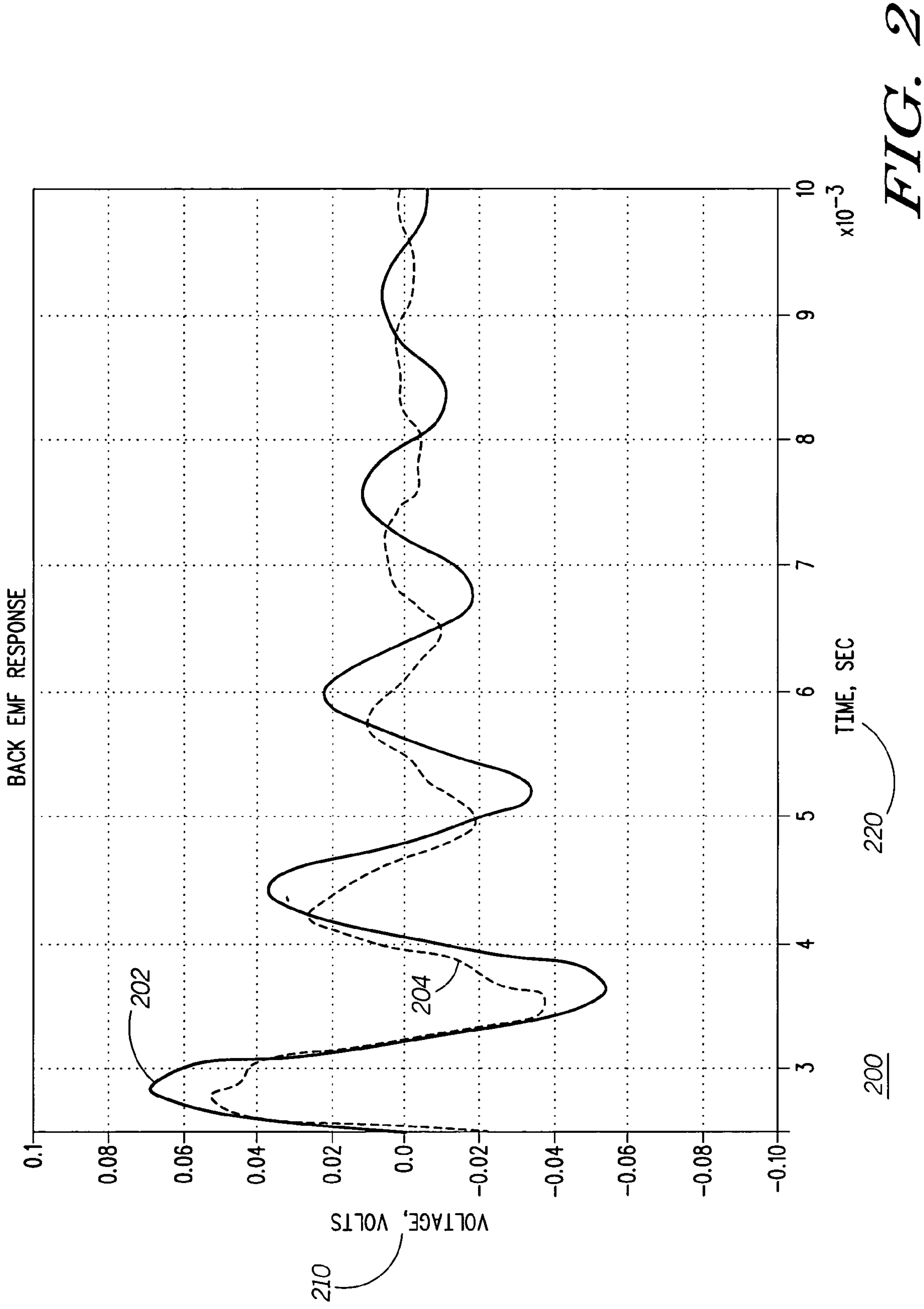
FIG. 2 is a graph of a sample response of voltage decay in the time domain under sealed and unsealed conditions.
Figure 3:
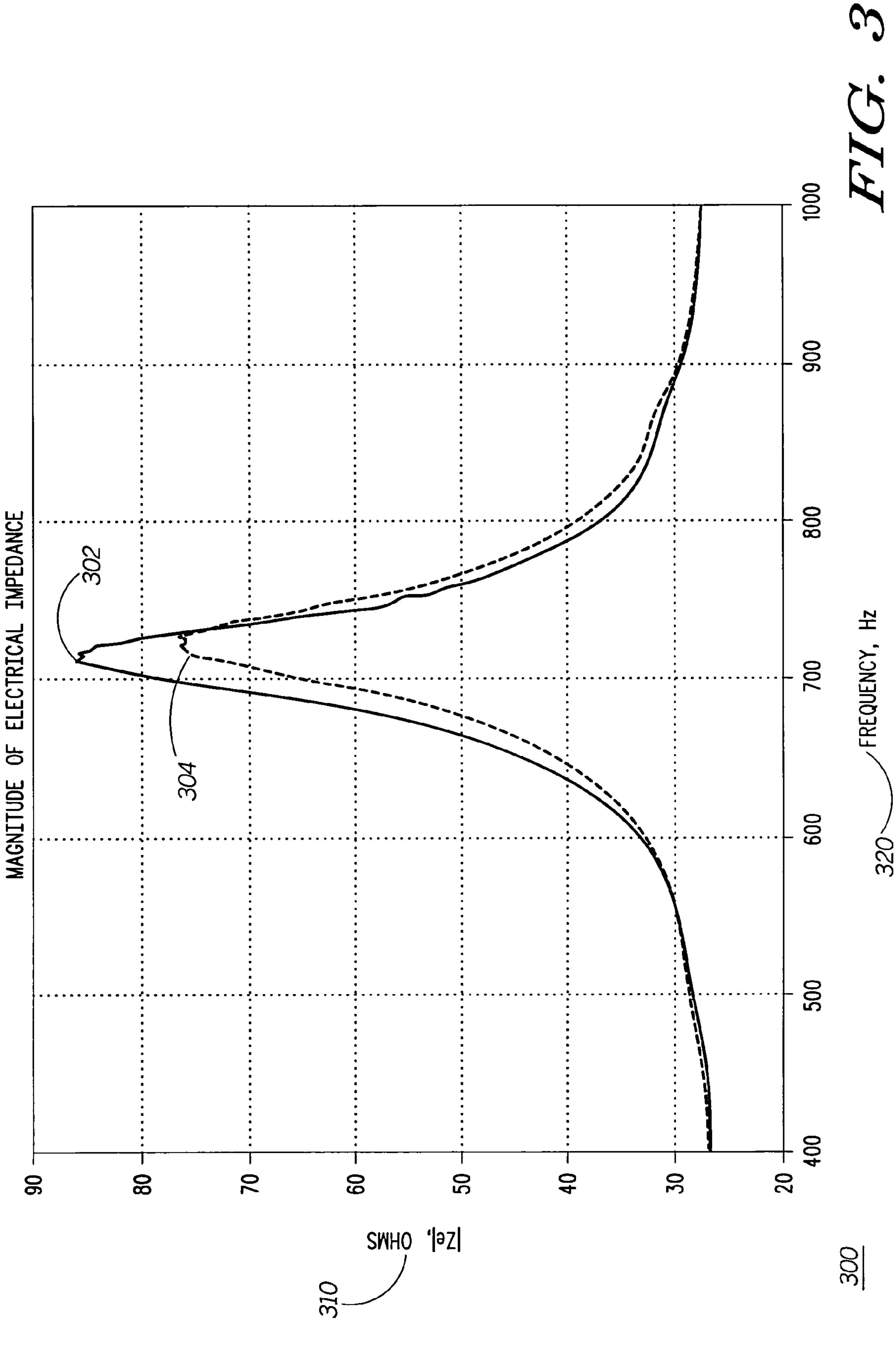
FIG. 3 is a graph of a sample response of magnitude of electrical impedance in the frequency domain under sealed and unsealed conditions.

Different excitation signals can be applied to terminals 112. For example a sinusoidal, square wave or DC voltage signal can be applied to and removed from terminals 112. The back EMF response 126 generated from the speaker is monitored at terminals 112 and a Q characteristic of the EMF response is determined. The Q can be established using either time domain or frequency domain data. FIG. 2 is a graph 200 of a sample response of voltage decay 210 in the time domain 220 under sealed 202 and unsealed 204 conditions. FIG. 3 is a graph 300 of a sample response of magnitude of electrical impedance 310 in the frequency domain 320 under sealed 302 and unsealed 304 conditions. The difference in magnitude between signal 302 and 304 is due to the different damping generated at speaker terminals 112 in response to the excitation signal. The formulas listed below are a few examples of formulas that can be used to determine the Q of the EMF response depending on whether time domain or frequency domain is preferred.

1) Q=the reciprocal of two times the damping factor.
2) $Q=2\pi$ times the number of cycles required for the energy to decay 1/e.
3) $Q=\pi$ times the number of cycles required for the amplitude to decay 1/e.
4) $Q=\pi N/\ln(x)$, where N=number of cycles for the amplitude to decay by factor of x.
5) $Q=f_0/A\Delta f_{-3dB}$, where $f_0$ is the resonant frequency and $\Delta f_{-3dB}$ is the half power bandwidth.
6) $Q=2\pi f_0 m/r_m$, where $f_0$ is the resonant frequency, m is the mass, and $r_m$ is the mechanical resistance.

Figure 4:
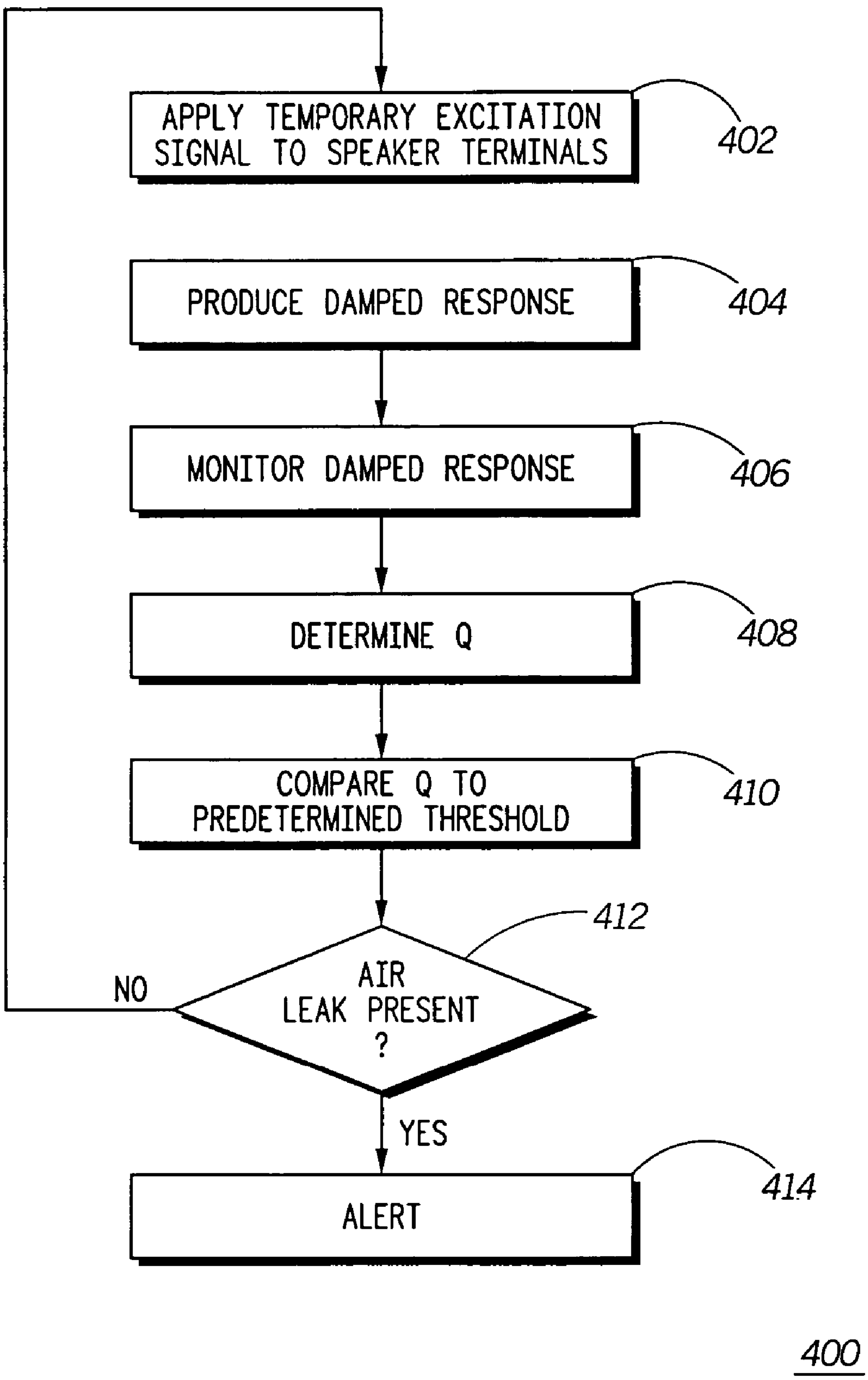
FIG. 4 is a method of testing for an air leak in a communication device in accordance with the present invention.

In accordance with the present invention, monitoring the back electromotive force at the speaker terminals after an excitation signal is applied to and removed from the speaker terminals provides a technique for determining the existence of an air leak in a communication device. In FIG. 4, the method 400 of testing for the air leak in accordance with the present invention comprises the steps of applying a temporary excitation signal to the speaker terminals 402 thereby producing a damped response 404 and then monitoring the damped response 406. By determining the Q characteristic of the damped response 408 and comparing the Q to a predetermined threshold 410, an air leak is deemed to be present when the Q falls outside of the predetermined threshold 412. An alert 414 may be used to provide notification of the leak. The alert may be in a visual, audible and/or data format and can be established to notify an end user of the need to service the communication device 100.

The controller circuitry 110 of the communication device is preferably programmed to provide the alert when the Q falls outside of the predetermined threshold. The air leak self-diagnosis facilitates the detection of leaks both in a factory environment and out in the field. The self-diagnosis leak test can be incorporated into existing final software checks performed in a factory to catch assembly failures. The air leak self-diagnosis technique of the present invention may be run automatically, for example, upon power up or may be user-enabled. The air leak self-diagnosis technique allows a service center to quickly indicate to a technician that a leak is present without ever opening the communication device. Thus, factory environments, field servicing and end users can all benefit from the leak self-diagnosis feature of the present invention.

Accordingly, there has been provided an air leak self-diagnosis technique for a communication device that does not require the use of external vacuums or accessories. The elimination of the factory vacuum test reduces test cycle time and cost. Furthermore, the self-diagnosis feature allows an end user and/or service technician to be notified of any leaks so that a repair can take place prior to any product failure.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of testing for a leak in a portable communication device, comprising a controller for performing the steps of:

applying an excitation signal to speaker terminals enclosed in a speaker, the speaker housed in the portable communication device;

removing the excitation signal from the speaker terminals;

monitoring a back electro-motive force at the speaker terminals after removal of the excitation signal; and testing for an air leak in the portable communication device based on the back electro-motive force.

2. A method of testing for a leak in a portable communication device, comprising:

applying a temporary excitation signal to speaker terminals enclosed in a speaker to produce a damped response, the speaker housed in the portable communication device;

monitoring the damped response of the speaker after removal of the temporary excitation signal;

determining the Q of the damped response;

comparing the Q to a predetermined threshold;

determining the presence of an air leak in the portable communication device based on the comparison; and providing an alert at the portable communication device when the Q falls outside of the predetermined threshold, wherein the alert is in the format of at least one of an audio, a visual and a data alert.

3. The method of claim 2, wherein the Q is determined in the frequency domain.

4. The method of claim 2, wherein the Q is determined in the time domain.

5. A portable communication device, including:

a housing;

a speaker coupled to the housing; and the portable communication device providing air leak self-diagnosis for determining the presence of an air leak within the portable communication device by monitoring signal characteristics of the speaker, wherein the signal characteristics of the speaker are based on a back electro-motive force (EMF) response from the speaker generated after removal of an excitation signal applied to the speaker.

6. The portable communication device of claim 5, wherein the air leak is determined based on one of: zero crossings, time decay, and amplitude of the EMF response.

7. The portable communication device of claim 5, wherein the air leak is determined based on at least one of: zero crossings, time decay, and amplitude of the EMF response.

8. The portable communication device of claim 5, wherein a Q characteristic is determined for the EMS response: the Q characteristic further being determined based on at least one of time domain and frequency domain of the EMF response.

* * * * *

CERTIFICATE OF CORRECTION

PATENT NO. : 7,570,769 B2
APPLICATION NO. : 10/830669
DATED : August 4, 2009
INVENTOR(S) : Garcia et al.

It is certified that error appears in the above-identified patent and that said Letters Patent is hereby corrected as shown below:

IN THE DRAWINGS

In Fig. 4, Sheet 4 of 4, delete "

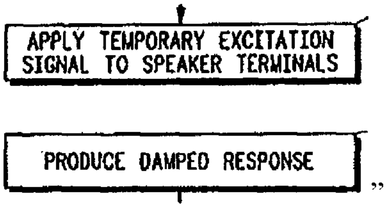

" and insert --

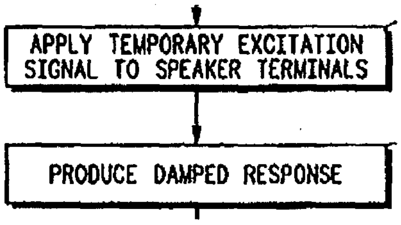

--, therefor.

IN THE SPECIFICATION

In Column 2, Line 40, delete "Q=f0/AΔf-3dB," and insert -- Q=f0/Δf-3dB, --, therefor.

IN THE CLAIMS

In Column 4, Line 34, in Claim 8, delete "EMS" and insert -- EMF --, therefor.

Signed and Sealed this
Sixth Day of December, 2011

David J. Kappos
*Director of the United States Patent and Trademark Office*